United States Patent
Makhov et al.

(10) Patent No.: US 10,713,181 B1
(45) Date of Patent: *Jul. 14, 2020

(54) METHOD AND SYSTEM FOR SHARING DRIVER PAGES

(71) Applicant: Parallels IP Holdings GmbH, Schaffhausen (CH)

(72) Inventors: Pavel Makhov, Moscow (RU); Marina Kudinova, Moscow (RU); Alexey Kostyushko, Moscow (RU); Mikhail Philippov, Moscow (RU)

(73) Assignee: Virtuozzo International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/281,468

(22) Filed: Feb. 21, 2019

(51) Int. Cl.
| | | |
|---|---|---|
| *G06F 9/455* | (2018.01) | |
| *G06F 9/4401* | (2018.01) | |
| *G06F 12/109* | (2016.01) | |
| *G06F 9/445* | (2018.01) | |

(52) U.S. Cl.
CPC .......... *G06F 12/109* (2013.01); *G06F 9/4411* (2013.01); *G06F 9/44563* (2013.01); *G06F 9/44594* (2013.01); *G06F 9/45558* (2013.01); *G06F 2009/45579* (2013.01); *G06F 2009/45583* (2013.01); *G06F 2212/656* (2013.01)

(58) Field of Classification Search
CPC ............. G06F 9/44563; G06F 9/44594; G06F 9/45558; G06F 2212/656; G06F 2009/45583; G06F 2009/45579; G06F 12/023; G06F 12/1009; G06F 12/109; G06F 9/4411; G06F 9/455; G06F 2212/657; G06F 2212/1044
See application file for complete search history.

(56) References Cited

U.S. PATENT DOCUMENTS

| | | | | |
|---|---|---|---|---|
| 7,356,808 B2 * | 4/2008 | Bonsteel | ............. | G06F 9/45537 717/138 |
| 7,870,153 B2 * | 1/2011 | Croft | ..................... | G06F 3/1415 707/781 |
| 7,882,274 B2 * | 2/2011 | Peterson | ............. | G06F 9/45558 710/10 |
| 7,949,677 B2 * | 5/2011 | Croft | ..................... | G06F 3/1415 707/781 |

(Continued)

*Primary Examiner* — Christopher D Birkhimer
(74) *Attorney, Agent, or Firm* — Bardmesser Law Group

(57) ABSTRACT

On a computer system having a processor, a single OS and a first instance of a system driver installed and performing system services, method for sharing driver pages among Containers, including instantiating a plurality of Containers that virtualize the OS, wherein the first instance is loaded from an image, and instantiating a second instance of the system driver upon request from Container for system services by: allocating virtual memory pages for the second instance and loading, from the image, the second instance into a physical memory; acquiring virtual addresses of identical pages of the first instance compared to the second instance; mapping the virtual addresses of the identical pages of the second instance to physical pages to which virtual addresses of the corresponding pages of the first instance are mapped, and protecting the physical pages from modification; and releasing physical memory occupied by the identical pages of the second instance.

23 Claims, 14 Drawing Sheets

(56) References Cited

U.S. PATENT DOCUMENTS

| | | | | |
|---|---|---|---|---|
| 7,954,150 B2* | 5/2011 | Croft | G06F 3/1415 | 726/21 |
| 8,010,679 B2* | 8/2011 | Low | G06F 3/1415 | 709/227 |
| 8,051,180 B2* | 11/2011 | Mazzaferri | G06F 3/1415 | 709/227 |
| 8,117,314 B2* | 2/2012 | Croft | G06F 3/1415 | 709/227 |
| 8,341,270 B2* | 12/2012 | Mazzaferri | G06F 3/1415 | 709/227 |
| 8,341,732 B2* | 12/2012 | Croft | G06F 3/1415 | 726/21 |
| 8,355,407 B2* | 1/2013 | Wookey | G06F 3/1415 | 370/401 |
| 8,631,405 B2* | 1/2014 | Lublin | G06F 9/5033 | 718/1 |
| 8,650,563 B2* | 2/2014 | Lublin | G06F 9/5055 | 718/1 |
| 8,719,543 B2* | 5/2014 | Kaminski | G06F 9/5016 | 711/206 |
| 8,789,034 B1* | 7/2014 | Emelyanov | G06F 9/45558 | 717/169 |
| 9,043,498 B2* | 5/2015 | Guerin | G06F 15/17331 | 710/8 |
| 9,063,821 B1* | 6/2015 | Emelyanov | G06F 9/45558 | |
| 9,152,570 B2* | 10/2015 | Mehta | G06F 12/1009 | |
| 9,152,573 B2* | 10/2015 | Baskakov | G06F 12/109 | |
| 9,158,569 B2* | 10/2015 | Mitra | G06F 9/45558 | |
| 9,183,157 B2* | 11/2015 | Qiu | G06F 12/10 | |
| 9,348,819 B1* | 5/2016 | Emelyanov | G06F 16/2308 | |
| 2006/0064683 A1* | 3/2006 | Bonsteel | G06F 9/45537 | 717/162 |
| 2009/0083450 A1* | 3/2009 | Peterson | G06F 9/45558 | 710/10 |
| 2009/0083829 A1* | 3/2009 | Peterson | G06F 9/45558 | 726/1 |
| 2011/0214123 A1* | 9/2011 | Lublin | G06F 9/5055 | 718/1 |
| 2013/0227248 A1* | 8/2013 | Mehta | G06F 12/10 | 711/207 |
| 2013/0290645 A1* | 10/2013 | Van De Ven | G06F 9/44521 | 711/147 |
| 2013/0339568 A1* | 12/2013 | Corrie | G06F 12/023 | 711/6 |
| 2014/0229935 A1* | 8/2014 | Mitra | G06F 9/45558 | 718/1 |
| 2015/0067087 A1* | 3/2015 | Guerin | G06F 15/17331 | 709/212 |
| 2015/0293841 A1* | 10/2015 | Akirav | G06F 3/0683 | 711/104 |

* cited by examiner

METHOD AND SYSTEM FOR SHARING DRIVER PAGES

CROSS REFERENCE TO RELATED APPLICATIONS

This application is a continuation of U.S. patent application Ser. No. 14/945,678, filed on Nov. 19, 2015, incorporated herein by reference in its entirety.

BACKGROUND OF THE INVENTION

Field of the Invention

This invention relates to sharing resources among Containers and, more particularly, to a method and system for sharing common driver pages among the Containers.

Description of the Related Art

A modern trend of virtualization and isolation of resources requires a special approach to memory usage, since Containers might use the same set of drivers. When Containers are being initialized, each Container needs to install its own drivers, which are often identical for different Containers, including identical versions and identical code of the drivers. The executable code of these, essentially identical, instances of the same drivers is loaded into the computer's memory. In other words, each Container has its own instance of the driver. In a case of a large number of Containers on a hardware node, the amount of resident memory that is allocated to the drivers is often in the tens of megabytes or more. The system may contain sets of identical pages, which are continuously requested and are located in the random access memory constantly. If the pages belong to a pool of swappable pages, these pages then create an additional load on the swapping subsystem. For example, if the system is experiencing a lack of memory condition, and the drivers sequentially attempt to refer to the same identical pages, then the memory manager needs to constantly swap the pages from the disk to the RAM, and then swap them back from the RAM to the disk file.

FIG. 1 illustrates a conventional situation, where the various components compete for resources. Consider the case of two drivers, driver1 and driver2, each of which has a set of pages that it uses. However, there is insufficient free memory in the system in order to fully load both drivers, which can prevent drivers from loading and can affect execution of the Containers.

When the system loads many identical drivers, their code is identical, and the pages that contain the code are also identical, even though they occupy needed space in the memory. Also, if either driver uses swappable pages, then they can create an additional load on the page swap subsystem. The goal, therefore, is to create a deduplication mechanism for the pages of the executable code of identical drivers. All drivers with identical binary code should use the same common set of pages, rather than each driver having to work with its own set of pages, as is done conventionally. Also, making driver pages swappable affects performance.

Thus, what is needed is a method and system that can replace, in the memory, multiple sets of identical driver pages with a single instance of such pages.

SUMMARY OF THE INVENTION

The invention relates to a method and system for combining and sharing driver pages among Containers that substantially overcomes one or more disadvantages of the related art.

Accordingly, in one embodiment, a method and system are proposed for sharing driver pages among Containers. A first dedicated system driver installed under the OS and performing dedicated system services, a plurality of Containers are instantiated. Code and data of the dedicated system driver are loaded sequentially into a plurality of pages arranged in a virtual memory. An enumerated next dedicated system driver is instantiated upon a first request from one of the Containers for dedicated system services by: loading physical pages of a next enumerated dedicated driver into a physical memory and allocated virtual memory pages for the next enumerated dedicated driver; associating the next dedicated system driver with the first dedicated system driver and sequentially comparing pages of the next dedicated system driver and the first dedicated system driver, to generate a set of identical physical pages; mapping the virtual pages of the next enumerated system driver to corresponding identical physical pages of the first system driver while atomically protecting the identical physical pages of the first dedicated system driver from modification. Non-identical virtual pages of the next dedicated system driver remain mapped to the physical pages of the next dedicated system driver. The method also includes releasing the physical memory occupied by the identical physical pages of the next dedicated system driver; and starting the next dedicated system driver for responding to requests for the dedicated system services from the Container.

These steps can also be performed for a subsequent driver and another Container or for the same Container. The method can also optionally include copying and remapping physical pages before an attempt to modify the pages by any driver. Optionally the driver physical pages are randomly located in the physical memory, but are linked to the virtual driver pages in an order of the addresses of the virtual pages. The method can also optionally include intercepting driver loading and unloading to perform a cleanup of the mapped pages and allocating a random accessed memory for any private and the identical physical pages by a memory manager. The method can also optionally include enumerating the dedicated system driver prior to loading it into the Container by assigning a unique number to the driver. The method can also optionally include changing a name of the first dedicated system driver so that each Container has a driver with a unique name. The method can also optionally include loading the next dedicated system driver from a driver database, wherein the driver database contains information about which pages of which driver are identical, and wherein the comparing step uses the information from the driver database.

Optionally, the next dedicated system driver is installed and started upon a request from a user of the Container during operation of the Container. The identical physical pages that are not modifiable are shared among the Containers. The other pages (non-identical or modifiable) are private pages that store data of the Container. Each Container can modify its own private pages, but not the shared common physical pages. The method can also optionally include write-protecting the identical physical pages and remapping virtual pages of the subsequent drivers to the corresponding shared physical memory pages allocated by the OS. Optionally, shared physical memory pages are pre-allocated in a buffer. The method can also optionally include stopping the driver, which includes: allocating physical memory equal to the set of identical physical pages; remapping the virtual memory pages to the allocated memory; unloading the driver from the Container and the OS; and freeing up the allocated memory and the memory occupied by the non-identical pages.

The method can also optionally include loading Container-specific settings of the next driver into memory once the driver starts. The Container-specific settings include driver name substitution, registry parameters and file parameters. The identical pages are locked in the memory and are not subject to swaps to a disk.

In another embodiment, a computer-implemented method for sharing driver pages among Containers includes tracking loading and unloading of each instance of a driver in the Containers; upon a loading of a first instance of the driver, analyzing portions of executable files of the driver to find pages suitable to merge, to generate a zeroth set of pages; upon loading of a second instance of the driver (i) checking that the driver is the same as the first driver; (ii) generating a set of shared common pages among the drivers that is the zeroth set; (iii) substituting the common pages for pages of the second instance of the driver when the pages are identical; (iv) making virtual writeable pages copy on write and (v) returning freed up pages of the drivers back to the system; upon loading of a third and subsequent instances of the driver (i) checking that the drivers are the same as the first driver; (ii) substituting the common pages for pages of the drivers when the pages are identical; (iii) returning freed up pages of the drivers back to the system; (iv) making virtual writeable pages copy on write; during system operation, upon a write attempt to a common page, unmerging that page of the driver from the common page set; upon unloading of one of the instances of the driver, unmerging the pages of the instance of the driver being unloaded; and upon unloading of the last instance of the driver, deleting the zeroth set of pages.

According to another exemplary embodiment, code and data of the dedicated system driver are initially loaded into a plurality of separated sets of pages arranged by means of a virtual memory. Once one of the Containers requests the driver, the driver is instantiated by loading physical pages of the dedicated driver into physical memory, including loading Container-specific settings of the driver into the physical memory under usual mapping procedures. Then, the dedicated procedure running in a Host OS level detects or recognize if the dedicated system driver is the same as the previously loaded dedicated system driver and if "yes" use previously loaded data as a shared data.

If coincident drivers have been found in the system for the first time, then the pages to be shared are copied to a dedicated RAM area completely protected from modification. This area should be protected from accidental deleting, writing and swapping. This step is not strictly required, but moving pages to be shared and protected can simplify the overall performance, since the protected area may be specifically dedicated as a range of addresses and dedication protection for a specific RAM address is a simpler solution than random address protection.

Identical memory is then remapped in such a way that several virtual "read only" pages correspond to one physical page.

Then, the physical memory occupied by the identical pages of the next driver may be erased or released for further usage. Copy-on-write protection can be established for the shared area, since most operating systems cannot support a required protection algorithm internally or inherently.

As an option, while loading the driver initially have or can get the name containing generic driver name (tcpip) and a Container index—e.g., as a result, "tcpip_101.sys." Further, the running driver process has a corresponding Container index as a factor for isolation in the form of providing access to driver for host OS and processes with the same index only. Here it may be assumed that host OS processes have no index or a specific index, for example, "0".

This approach optimizes memory use and also provides for reliable isolation of the Containers with an acceptable level of security. It also saves host system resources such as memory and lowers the load on a subsystem responsible for memory swaps of pages from disk. Provisioning of the shared data can be implemented on several Containers. The approach can be implemented using a special driver for the OS that works in a "zeroth" Container, in other words, at the OS level. The shared data is provided by changing the address mapping between physical and virtual addresses of the pages of each of the instances of the drivers, after one such instance is loaded into the computer's memory.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
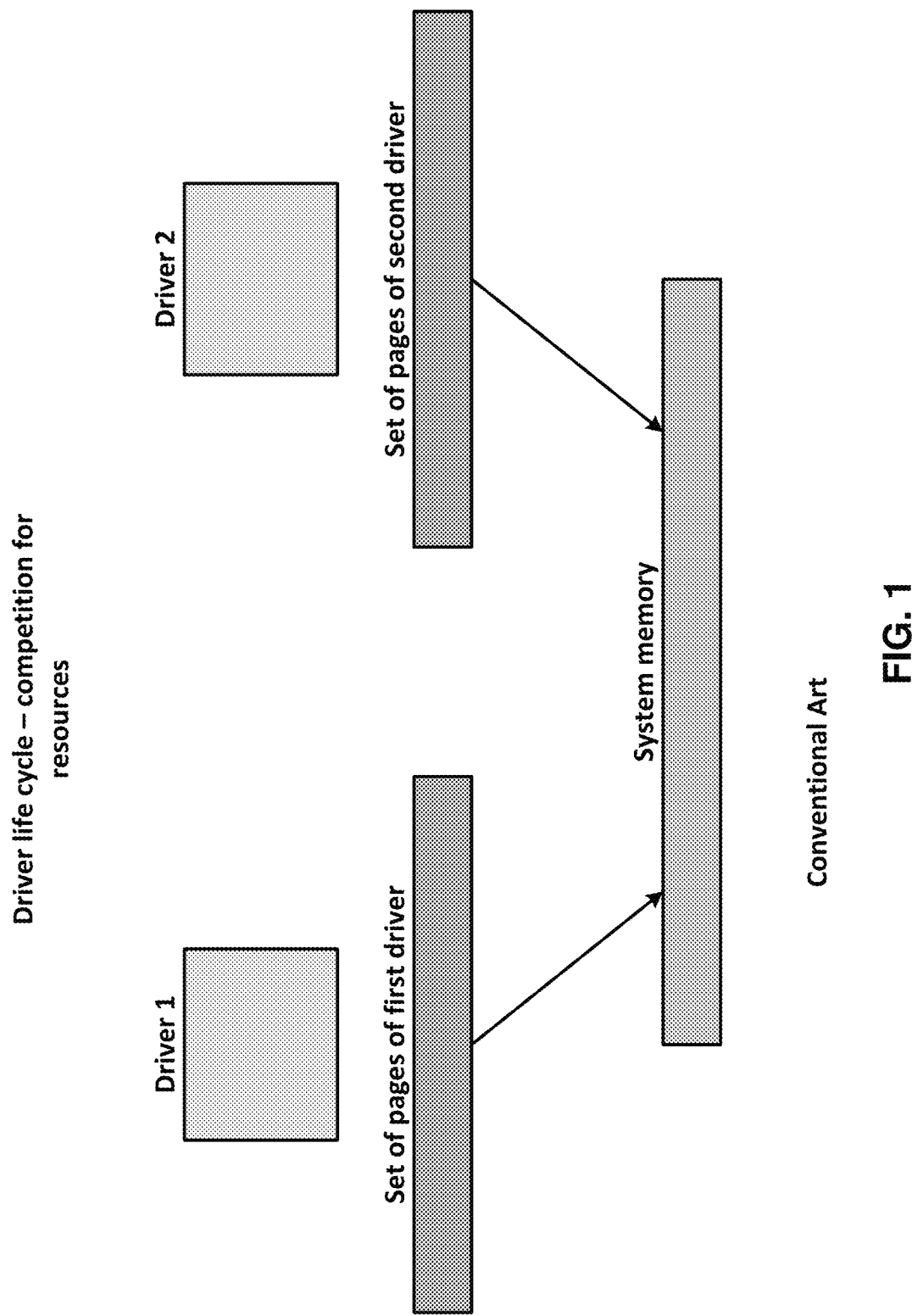
FIG. 1 illustrates a situation with multiple instances of the driver.

Reference will now be made in detail to the preferred embodiments of the present invention, examples of which are illustrated in the accompanying drawings.

The present invention is directed to a method, system and computer product for sharing the common (redundant) drivers' pages among the Containers.

A Virtual Environment/Container (VE, sometimes referred to as a Virtual Private Server or VPS)—is a type of an environment where multiple Containers run on the same hardware system with a shared OS kernel and most of the system resources, where isolation of the Containers is implemented on the namespace level using a kernel abstraction layer. A Container is a closed set, or collection, of processes, system resources, users, groups of users, objects, drivers and data structures. Containers are typically used to execute applications within them. Each Container has an ID, or some other identifier, that distinguishes it from other Containers. The Container offers to its users a service that is functionally substantially equivalent to a standalone server with remote access. From the perspective of an administrator of the Container, the Container should preferably act the same as a designated computer at a data center.

Steps

The following describes the operation of the method according to one exemplary embodiment. The steps of the method are: tracking loading and unloading of each instance of a driver in the Containers; upon a loading of a first instance of the driver, analyzing portions of executable files of the driver to find pages suitable to merging, to generate a zeroth set of pages; upon loading of a second instance of the driver (i) checking that the driver is the same as the first driver; (ii) generating a set of shared common pages among the drivers that is the zeroth set; (iii) substituting the common pages for pages of the second instance of the driver when the pages are identical; (iv) making virtual writeable pages copy on write and (v) returning freed up pages of the drivers back to the system; upon loading of a third and subsequent instances of the driver (i) checking that the drivers are the same as the first driver; (ii) substituting the common pages for pages of the drivers when the pages are identical; (iii) returning freed up pages of the drivers back to the system; (iv) making virtual writeable pages copy on write; during system operation, upon a write attempt to a common page, unmerging that page of the driver from the common page set; upon unloading of one of the instances of the driver, unmerging the pages of the instance of the driver being unloaded; and upon unloading of the last instance of the driver, deleting the zeroth set of pages.

Advantage

According to the exemplary embodiment, the RO (read only) driver memory portion saved by sharing the pages occupies about 70% of drivers' memory. This is a significant resource optimization.

Analysis

According to an exemplary embodiment, when a first (or "zeroth" instance of coincident object code of a driver) is loaded in to the operating system, the driver image is analyzed in order to determine the common unchangeable pages and the unique Container-specific (including changeable) pages.

However, the same exact driver copy cannot be used for all of the Containers, because some data pages (e.g., pages containing network configuration) can contain container-specific data and have to be unique for each driver inside the Container. Additionally, the pages containing loader data and used for connecting several drivers (e.g., a table of import addresses IAT) have to be unique for each of the instances of the driver in the Container. At the same time, each driver has a majority of pages that can be shared by all of the instances of the drivers in the Containers. For example, the sections (pages of section) that contain driver executable code in most embodiments never change and can be used by all of the Containers.

After all sections are defined, the size of the sections in pages (e.g., 5, 8, 12 pages, etc.) is calculated. The section data is known and can be analyzed. Then, memory for sections that are not changeable (header, R, RE) is allocated. These memory pages are used for read only access. Then, a number of pages accessible for writes are calculated. The memory for these pages is allocated separately for each of the Containers.

According to the exemplary embodiment, the semantic analysis of the driver at its first loading may determine the possibly common and the unique Container pages.

Figure 5:
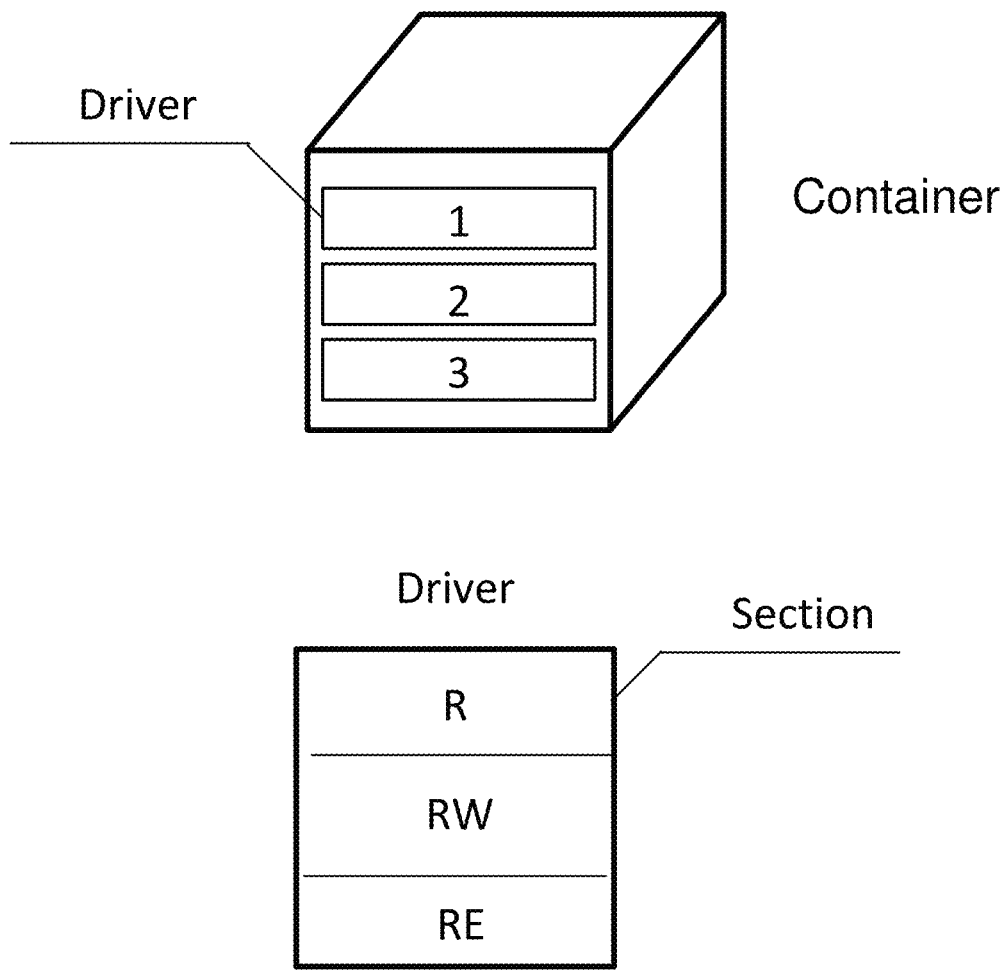
FIG. 5 illustrates an exemplary Container having several drivers consisting of n-sections.
Figure 6:
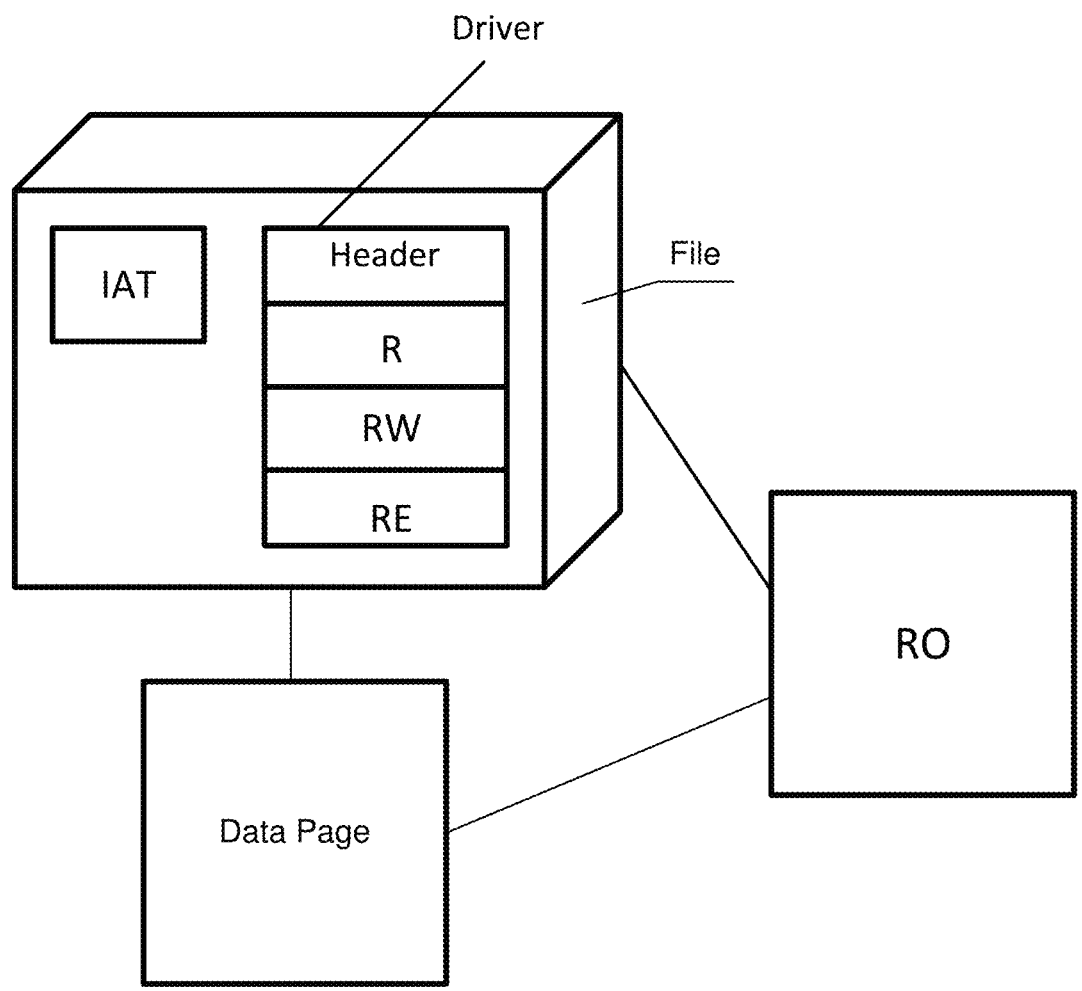
FIG. 6 illustrates how the driver structure is used in the exemplary embodiment.

As shown in FIGS. 5 and 6, an analysis of the various portions of the file is performed, in order to identify pages that are common to all the drivers. An example might be a loader of various images in WINDOWS, which, when the driver is loaded, determines the attributes of its pages based on those that the particular section has, which contains that page. When the system loads the first instance of the driver, it is necessary to find those pages of the driver page set that are suitable for merging. To do this, in the driver image that is loaded into the memory, it is necessary to find all the sections with the appropriate properties (attributes), and to remember (i.e., write to some storage) all the addresses of pages from the sections. The pages from this set will then be merged with analogous/identical pages from other instances of the driver.

FIG. 5 illustrates an exemplary Container having several drivers consisting of n-sections. Several drivers are loaded into the Container. Each driver consists of n-sections (not shown in the figure). Each of the driver sections has its own attributes: R (for read), RW (for read and write) and RE (for read and execute). Upon driver loading, all driver sections are analyzed based on their attributes. If the section has R and RE attributes, this means that during the driver operation write into this section will not occur, because this memory is protected from writes and an error will be generated. In other words, the driver sections with the attributes R and RE will not be modified. The driver section with the attribute RW stores Container-specific (private) data such as, for example, IP data.

FIG. 6 illustrates how the driver structure is used in the exemplary embodiment. A driver file has a header and different sections. R—read section, RW—read and write section and RE—read and execute section. IAT is the section, which contains a table of function addresses imported by the process. An arbitrary number and order of sections can be used. All modifiable sections (having RW attribute) and service data sections are selected. The IAT table has addresses and functions of other drivers that connect several drivers. The loader can write addresses of other drivers into the IAT and these addresses will differ for different Containers. The IAT table can be isolated since it is unique for each of the Containers.

In one embodiment, the drivers are analyzed in advance and the memory pages that are subject to change are placed into private areas of the Container memory at first loading. Thus, the driver loading process is, advantageously, simplified since the system does not have to perform all driver loading and configuration operations prior to data analysis. In one embodiment, the allocation of common pages by a special utility and configuration of private driver pages by the system are performed in parallel. Then, physical memory is allocated for each loaded copy of the driver and content of all unique (changeable) driver pages is copied into the physical memory.

Database

Using node-specific statistics, a sharing procedure can be started after or even instead of a first load of the specified driver. The data about these pages is generally stored in a driver descriptor in object code. Additional descriptors for all drivers may be generated as result of analysis of runtime code and may be stored in a database of drivers properties ("driver database").

For example, when the drivers are loaded into Container's environments, drivers' descriptors are loaded from the database. Then, while forming the driver image, or, in other words, loading diver image file into physical memory, only pages marked in the database (as unique) are loaded in a memory area. Other stable and shareable pages are loaded using virtualization techniques discussed below.

The changeable and unchangeable pages for each driver registered in the system and/or reflected or described in the database may be marked using specific descriptors.

In a partial embodiment the driver database can contain a descriptor pointing to the fact that the driver has been already loaded into memory and so can be shared. When a last driver copy is unloaded (i.e., when all Containers are stopped), the driver descriptor is deleted.

In order to analyze driver pages in terms of possible or current common use, a logical driver fragmentation implemented by a vendor (e.g., the driver image has logical sections having specific purpose and corresponding attributes) can be considered. The driver sections contain driver code, unchangeable data, changeable data, loader data and service data. Driver sections' hashes, along with semantic descriptions of a driver name, purpose and properties, can be stored in the driver database for future analysis. The data with similar hashes for the pages is recognized as the same data content. In one embodiment, special data blocks for consistent servers with stable data content are formed. These data blocks are loaded at system loading. For example, if all network drivers contain an identical block of executable code, this block is formed at system loading and used for shared access.

Analysis of the Drivers

When the new instance of a driver is loaded into the system, its identity to the other drivers needs to be compared, because any differences in the code can lead to unpredictable results. The primary criteria for this are the driver name and its version, although more complex methods for identity verification can be used. To check the identity of the first dedicated system driver and the next dedicated system driver, information about their names, versions, driver checksums, etc. can be used. Identical drivers have equal checksums. Therefore, such approach is simpler and faster than sequentially comparing driver pages, as it can immediately reject non-identical drivers. For drivers with equal checksums additional checks can be performed.

In a partial embodiment the system checks if the dedicated system driver is the same as the previous dedicated system driver and sequentially compares pages of the next dedicated system driver and the first dedicated system driver.

Loading

Driver loading and unloading are intercepted to allocate a random access memory for private and common driver pages by a memory manager and to perform a cleanup of the mapped pages.

The loading of the driver, in the exemplary embodiment, is tracked using common system calls, such as PsSetLoadImageNotifyRoutine in MICROSOFT WINDOWS, or similar in other OS's.

Example of a Driver Load

For example, a driver consists of the memory pages located in memory sequentially:

A
B
C
D
E

The analysis of the driver image indicates that pages A, C, D are unchangeable and can be shared, while pages B and E are unique changeable pages. Upon loading of a first copy of the driver, a physical memory containing three pages A, C and D all 5 pages is allocated but only 3 pages link to the physical pages that will later become shared. Upon loading of any subsequent copy of the driver, only physical memory for the two pages B and E is allocated. The pages A, C, D are accessed at the corresponding virtual memory addresses (in a set order), but actually reside in a previously allocated physical memory. Accordingly, at unloading of the driver copy, only the changeable physical pages B and E are freed up. This approach provides for a significant reduction in physical memory usage when several copies of the same driver are loaded.

Driver Load Illustration

Figure 7:
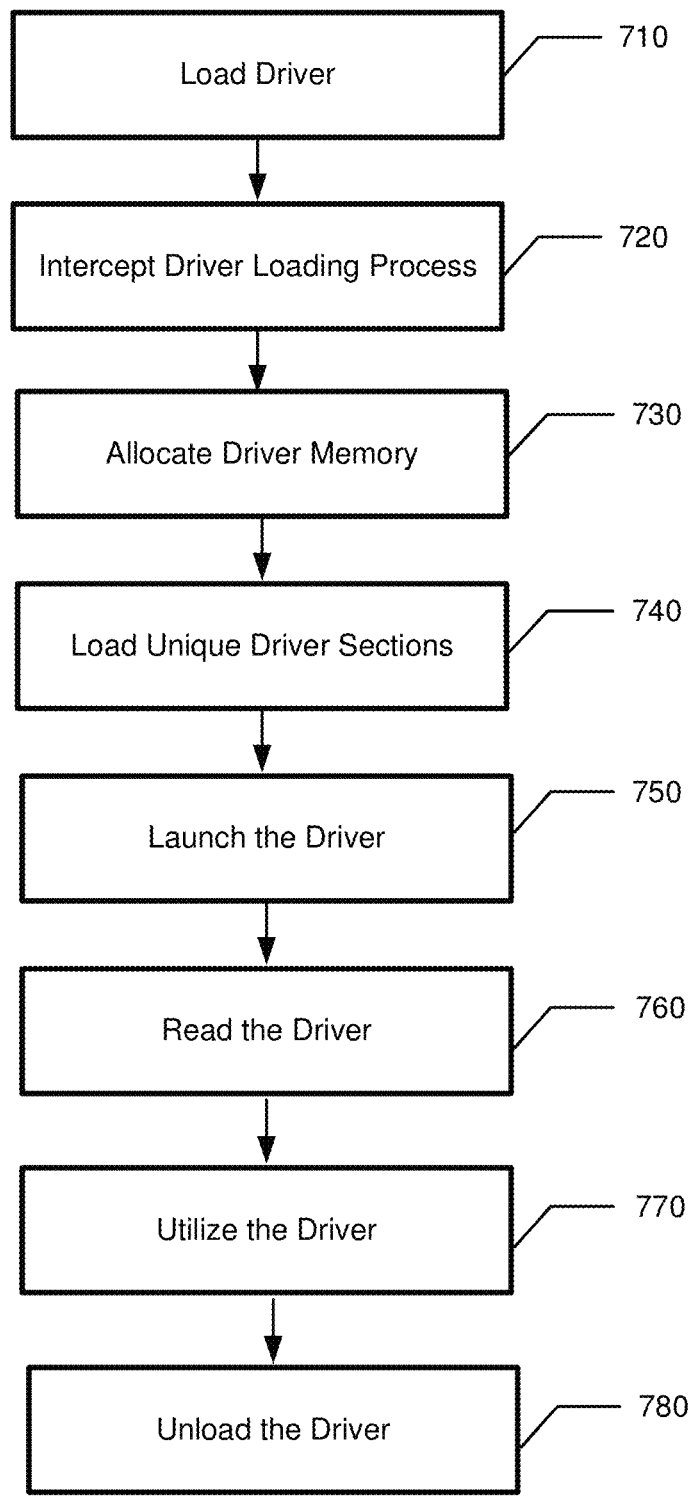
FIG. 7 illustrates a general flowchart of a life cycle of the drivers.

FIG. 7 illustrates a general flowchart of a life cycle of the drivers. In step 310, a driver is loaded. The process intercepts the driver loading process in step 320. In step 330, the process allocates driver memory. In step 340, the process loads unique driver sections (pages). In step 750, the driver is launched. In step 760, the process reads the driver. The process utilizes the driver in step 770 and the driver is unloaded in step 780.

Figure 8:
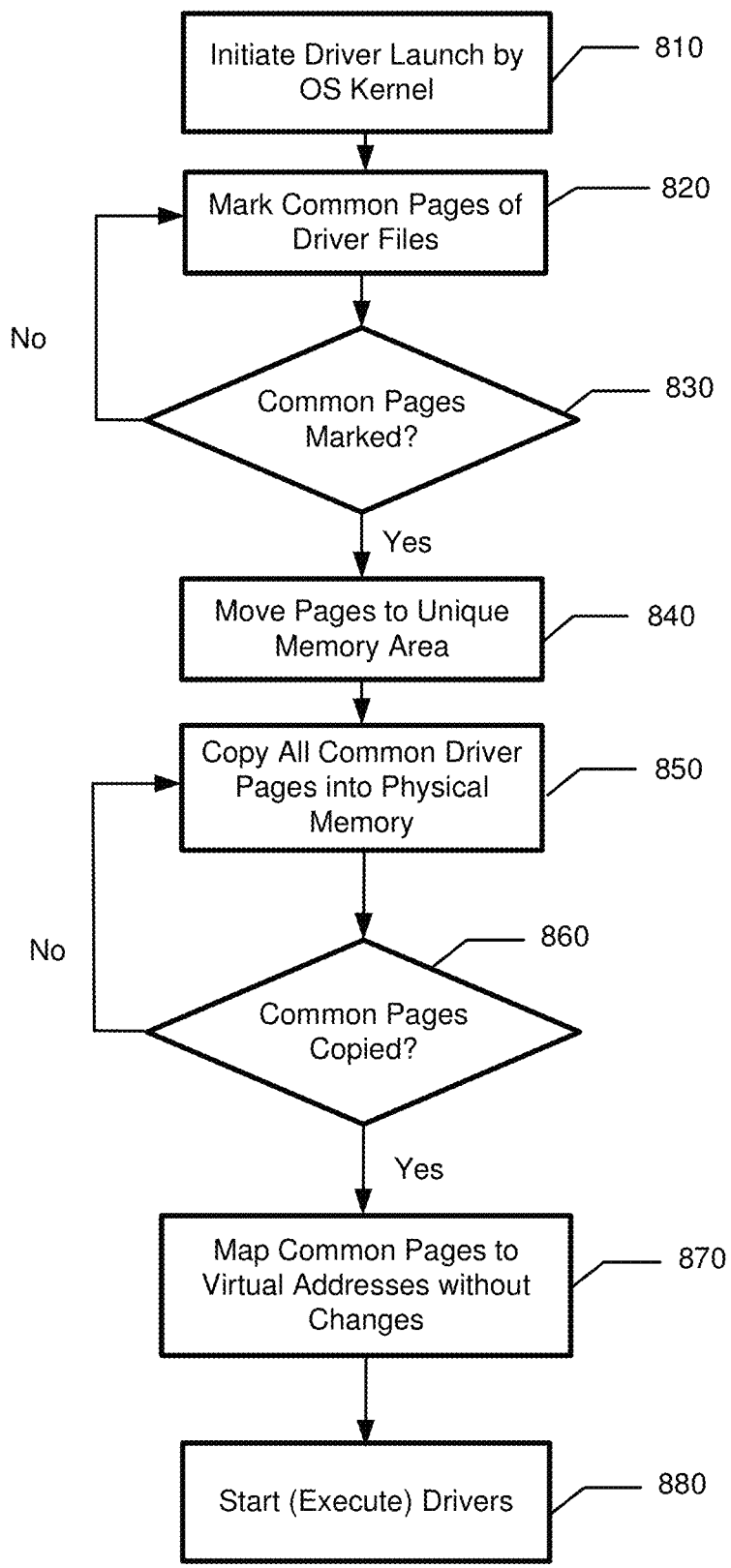
FIG. 8 illustrates a more detailed flowchart for a method for sharing driver pages.

FIG. 8 illustrates a flowchart for a method for sharing driver pages, in accordance to one exemplary embodiment. In step 810, driver launch is initiated by OS kernel. The process marks common pages of driver files in step 820. The process checks if the common pages are marked in step 830. If the common pages are marked, the pages are moved to a unique memory area in step 840. Otherwise, the process returns to step 820. In step 850, the process copies all common driver pages into physical memory and check if all pages are copied in step 860. If all pages are copied, the process maps the common pages to their own virtual addresses without changes in step 870. Otherwise, the process returns to step 850. The process starts executing of the drivers in step 880.

Figure 9:
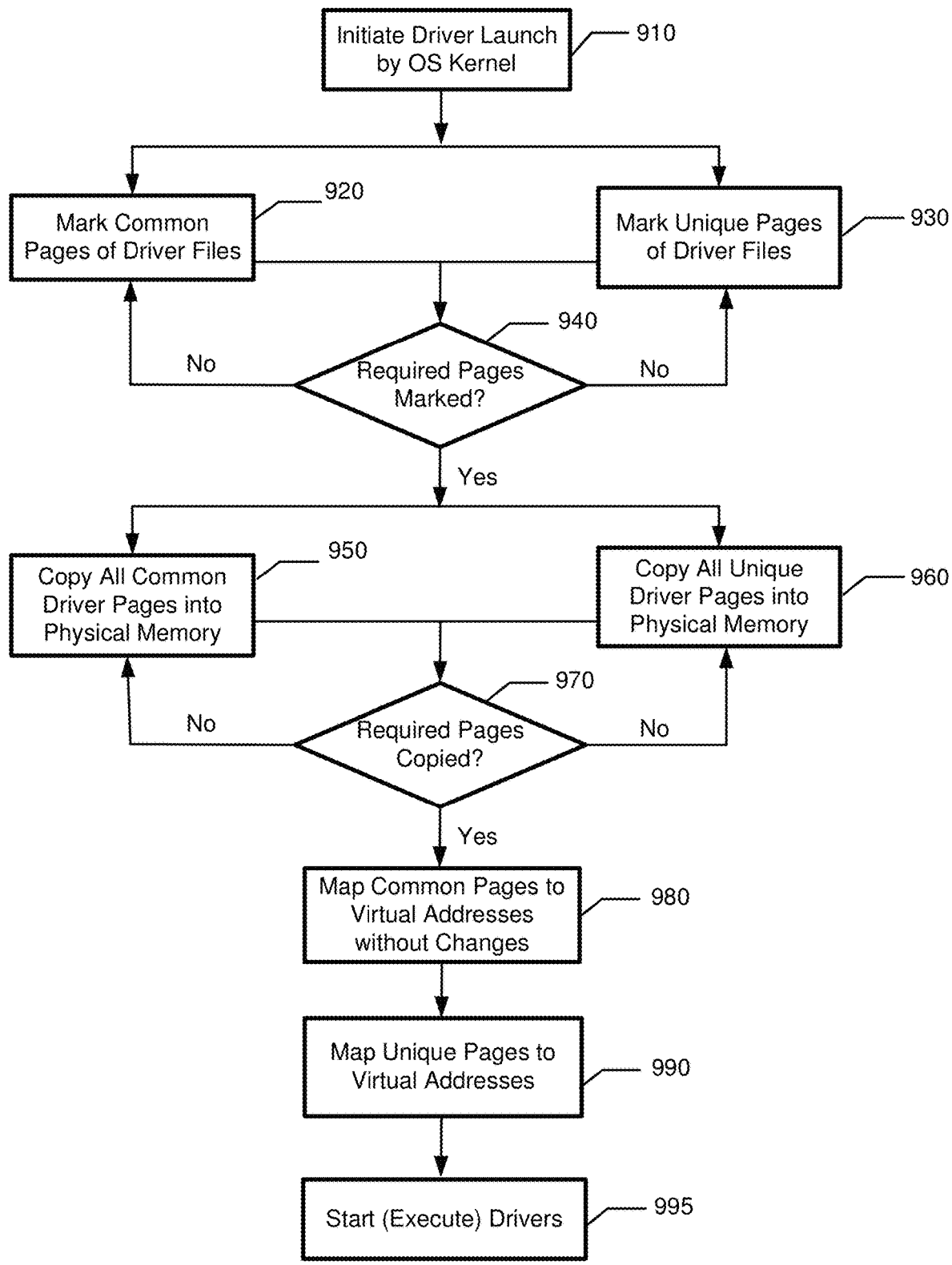
FIG. 9 illustrates a flowchart for a method for sharing driver pages, in accordance with another exemplary embodiment.

FIG. 9 illustrates a flowchart for a method for sharing driver pages, in accordance to another exemplary embodiment. In step 910, driver launch is initiated by OS kernel. Common pages of driver files are marked in step 920. The process marks unique pages of driver files in step 930. In step 940, the process checks if the required pages have been marked. If the pages have not been marked the process returns to steps 920 and 930. Otherwise, in step 950, the process copies all common driver pages into physical memory and copies all unique driver pages into physical memory in step 960. The process checks if the required pages have been copied in step 970. If the required pages have not been copied, the process returns to steps 950 and 960. Otherwise, the process maps the common pages to their virtual addresses without changes in step 980 and the process maps the unique driver pages to the virtual addresses in step 990. Then, the process starts executing of the drivers in step 995.

Figure 10:
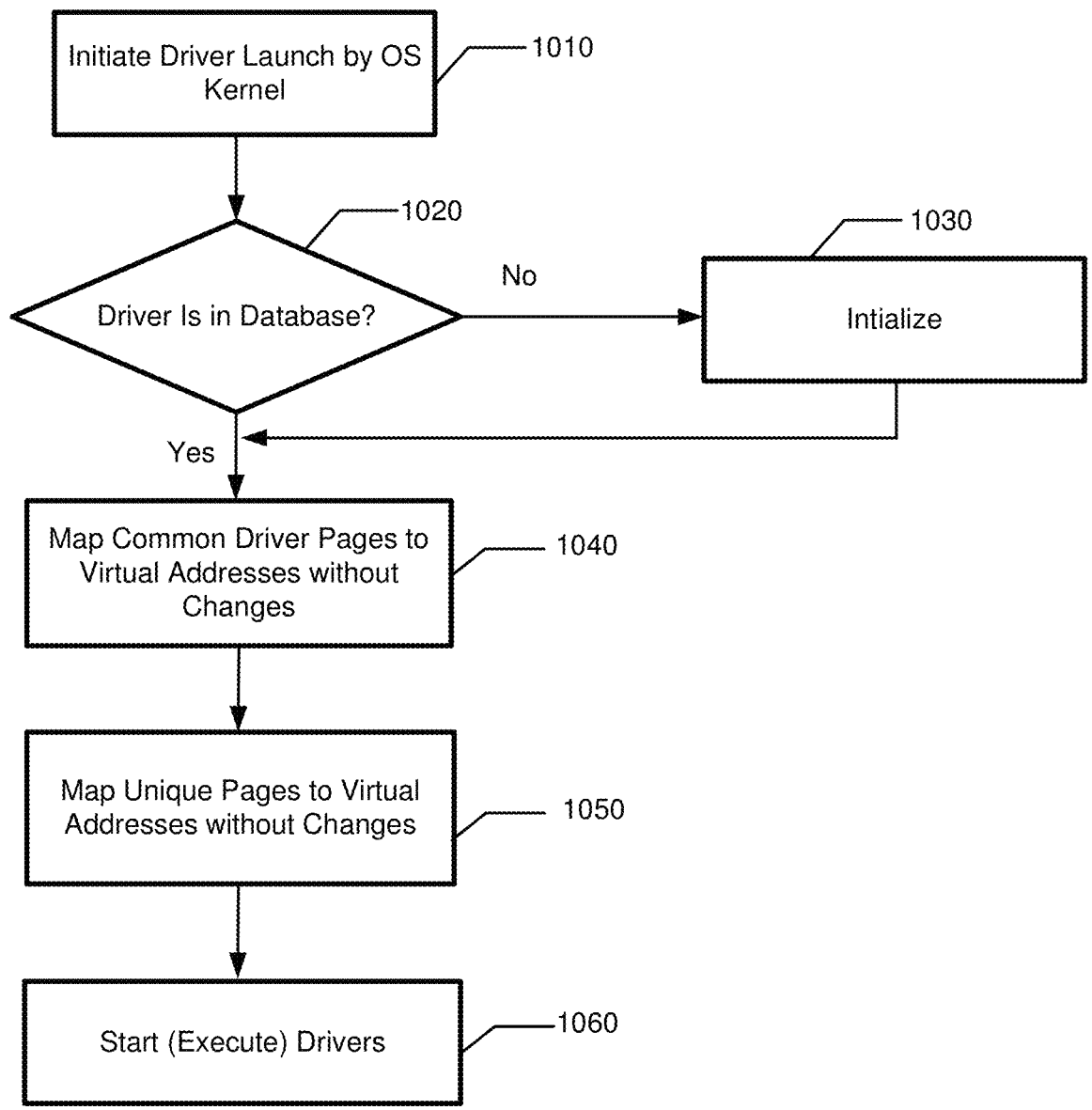
FIG. 10 illustrates a flowchart for a method for sharing driver pages using driver data stored in a database, in accordance to the exemplary embodiment.

FIG. 10 illustrates a flowchart for a method for sharing driver pages using driver data stored in a database, in accordance to the exemplary embodiment. In step 1010, driver launch is initiated by OS kernel. The process checks if the driver is in a database in step 1020. If the driver is not found, the process initializes the driver in step 1030. In step 1040, the process maps the common driver pages to virtual addresses without changes and, in step 1050, the process maps the unique driver pages to virtual addresses without changes. The driver execution is started in step 1060.

Figure 11:
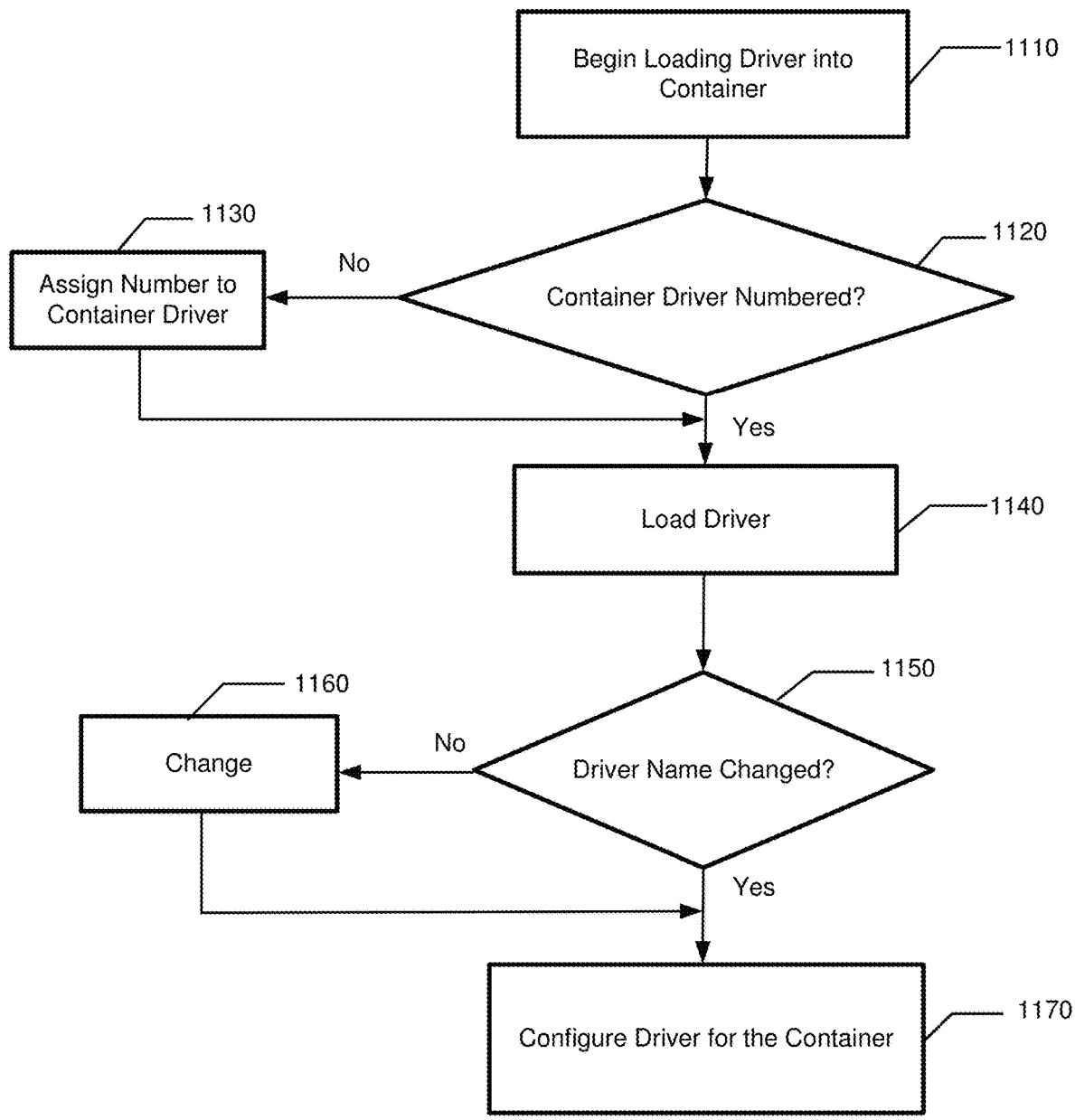
FIG. 11 illustrates a flowchart for a method for configuring a driver for the Container.

FIG. 11 illustrates a flowchart for a method for configuring a driver for the Container. In step 1110, the process begins loading driver into Container. In step 1120, the process checks if the Container driver numbered. If the driver instance is not numbered, the process assigns a number to the container driver in step 1130. Then, the process loads the driver in step 1140 and checks if the driver name has changed in step 1150. If the driver name has not changed, the process changes the driver name in step 1160 and configures the driver for the Container in step 1170.

In another exemplary embodiment the following steps are performed while loading a driver.

Zeroth Set of Pages

In one partial exemplary embodiment a set of common physical pages ("zeroth set of pages") is created in order to perform the merging of the pages. Physical pages are allocated, one for each such common (identical) page of the driver. The contents of the common pages are then written to be the physical pages, and the attributes are specified (see below). This "zeroth" set of pages will then be the set of pages to which all of the "common" virtual pages of all the instances of the driver will refer to, in all the Containers where the deduplication is applied. In other words, all the instances of the drivers will work with these "zeroth" set of pages.

The zeroth set of pages does not belong to any of the instances of the driver, in order to avoid unload problems. If the zeroth set of pages is created based on the set of pages of, for example, first driver that is loaded, and if that driver is unloading, then all the other drivers have to be remapped to some other driver, and this would occur every time such a "main" driver is swapped out. On the other hand, if the zeroth set of pages does not belong to any particular instance of the driver, then no matter which of the drivers is unloaded (swapped) to the disk, this will not affect the operation of the other drivers.

Remap

The common physical memory pages of drivers are remapped so that each container has own virtual addresses for common pages, and all common pages have a single physical instance stored in a specifically protected RAM area.

The pages are located in physical memory and can be mapped to the address space in any order—i.e., they can be mapped to different virtual addresses. The driver physical pages are randomly located in the physical memory, but are linked to the corresponding virtual driver addresses. Thus, the processor can access the page at different virtual addresses and actually access the same physical page. For example, the physical page containing data can be simultaneously accessible at exemplary virtual addresses 0x1000 and 0x4000. This allows for mapping one set of driver pages to several virtual addresses, so from a view point of the executable code, these pages appear as pages contained in separate loaded drivers.

According to the exemplary embodiment, code and data of the dedicated system driver are loaded sequentially into a plurality of pages arranged in a virtual memory.

Figure 2:
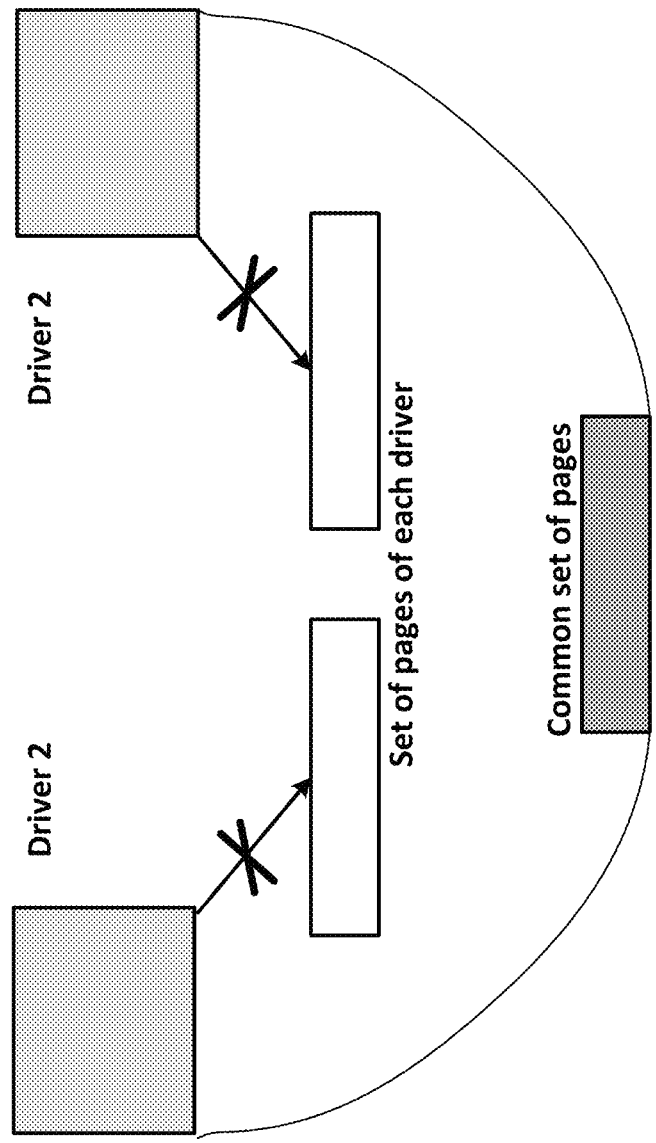
FIG. 2 illustrates merging of the pages when drivers are loaded.

FIG. 2 illustrates the merging the pages of two instances of a particular driver in one examplary embodiment. It also shows the substitution of the driver physical pages with physical pages of the common ("zeroth") set.

The physical pages of the driver are substituted for with the physical pages of the common set, and the driver now refers to the physical pages from the common set, while "forgetting" about its previous set of physical pages, ("native") pages, even though those pages are still in the memory. Initially each driver has its own set of pages. Then, the driver stops referring to its own physical pages, which are then freed and returned to the system, and starts referring to the identical physical pages from the common set. The virtual addresses of the driver pages are unchanged. This means that the links between the virtual addresses of the pages of the driver and the corresponding "native" physical pages are broken. The virtual addresses of pages now are mapped to the physical pages of "zeroth" set. The driver addresses its own pages using their virtual addresses. Then, in order to translate the virtual address to a physical address, the PTE (page table entries) are used, which contain the number of the necessary page in the PFN (page frame number) database. Thus, when the driver refers to the one of its identical pages, the virtual address of the page, remains the same, while the physical page to which it refers has changed. Therefore, the PTE value corresponding to the virtual address needs to change, and the new number of the physical page and its attributes needs to be entered.

In another exemplary embodiment the pages of the first dedicated driver are used as a common set of pages. For this the common (identical) pages of the first dedicated driver should be locked in memory (are not swappable) and are write protected (read only).

Release

The next step is returning of the unused "native" physical pages of the driver back to the system. These are the pages to which the driver referred originally, and which have been substituted with the pages from the common "zeroth" set.

In addition to the above, the step can also include operations necessary to track the offloading of each driver instance to the disk. In one exemplary embodiment, particularly the WINDOWS version, tracking of the offloading/swap out occurs at this point.

Swap

In a partial embodiment, the invention may use a feature where MICROSOFT WINDOWS divides the kernel-mode address space into paged and non-paged memory pools (user mode address space is pageable). Pages that must always be resident in the memory are assigned by the system in the non-paged pool, and pages used frequently are assigned to the paged pool. Some pages must always be in memory and must be fixed, or locked, in the same physical addresses. Device drivers are usually not paged; for example, an interrupt routine can't be paged out because one cannot know when an interrupt will be coming in. So sometimes it is of no use to protect driver pages from paging or swapping and sometimes there is a need. If the driver contains pageable pages assigned to shared memory, then the system is warned to assign such pages to non-pageable pool of data.

Due to a large number of released pages it may be effective to lock all shared pages in memory (never swap) for performance reasons.

Copy on Write

According to the exemplary embodiment, the process protects physical pages of the first dedicated system driver. So the writable pages are designated as Copy-On-Write pages.

After this, for each common virtual page of each new driver, and for all the pages of the zeroth set, the attributes and access rights are defined so that they are analogous to those that the driver instance had originally. Also, the writable pages need to be converted to Copy-On-Write pages. To do this, it is enough to drop the "writable" bit, and set the "Copy-On-Write" bit in the attributes of the page (for the X86 and X64 architectures).

Figure 3:
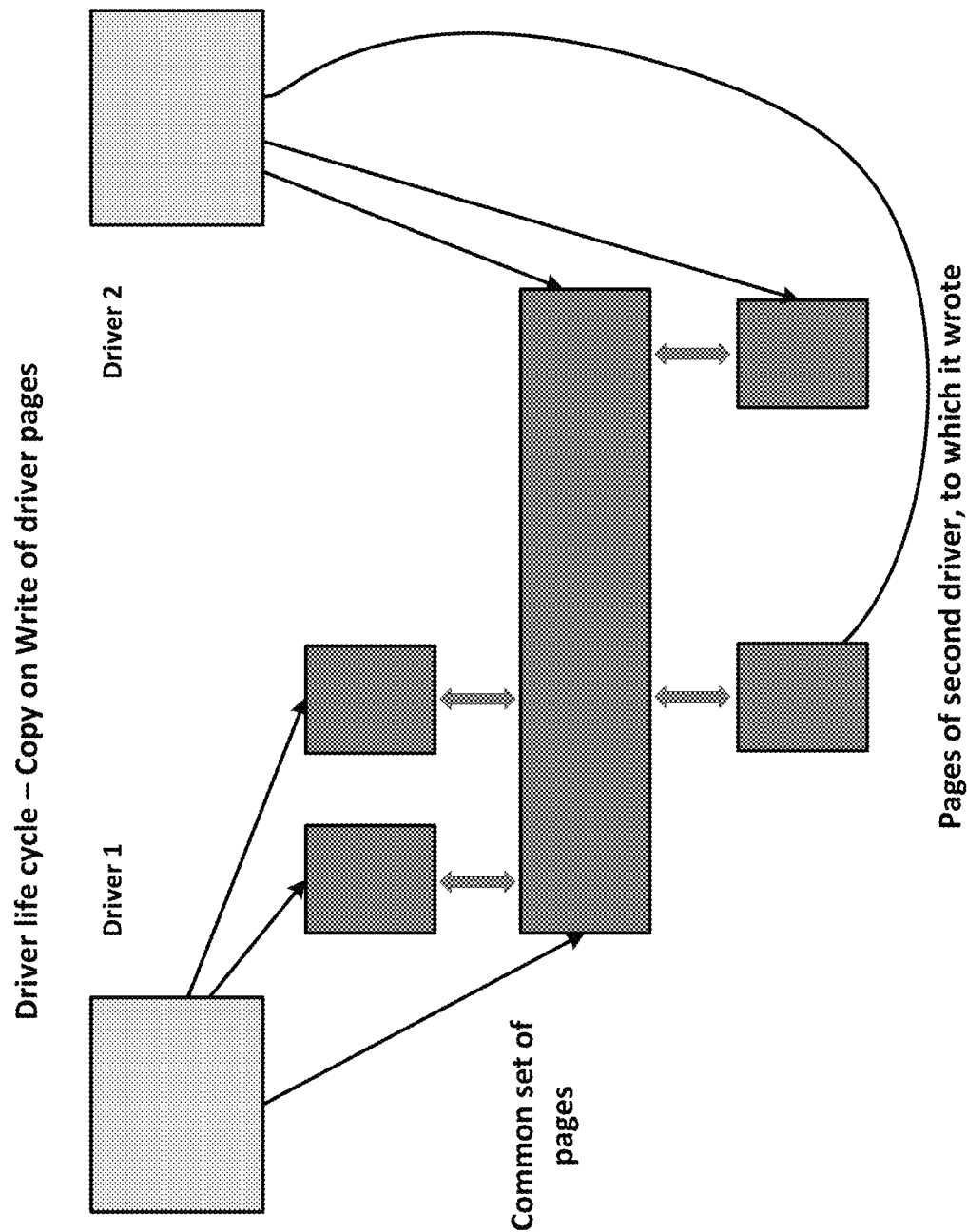
FIG. 3 illustrates a separation of the pages from the common set when writing to the page.

When everything is loaded, merged and ready for operation—the system works as follows. FIG. 3 illustrates how the system works for the driver. Since the driver does not notice the substitution of the pages, it can freely execute or read the contents of the pages. However, since merging the pages all of the instances of the driver refer to the same set of physical pages, the drivers are no longer allowed to write to these pages, because a modification by one of the driver instances will affect all of the other instances, which can cause unpredictable consequences.

Therefore, the drivers are forbidden to write to the common (shared) pages. However, since sometimes they still might have to write to their own pages occasionally, the Copy-On-Write mechanism is used. As shown in FIG. 3, a new physical page, a copy of one of the common set is given to the driver attempting to write to it. When a driver attempts to write anything to its own pages, a page fault exception occurs (since writes to the pages marked as Copy-On-Write are forbidden) and the pages are un-merged. In other words, this page is unmerged from the common set. The virtual page to which the driver attempted to write no longer refers to the corresponding physical page in the common set, and a new page is allocated—a copy, with identical contents, which is now available for writing to it by the driver. After that, page fault exceptions on this page of this driver will no longer be triggered, because this page fully belongs to the particular instance of the driver. Other drivers obviously do not notice these changes, as illustrated in FIG. 3.

In the normal course of events, many instances of the driver can try to write something to their own pages. Whenever that happens, new physical pages must be allocated. Thus, eventually, the system will have one common set of pages for all the drivers, and additional pages that contain individual modifications for each of the drivers themselves—in other words, the pages to which those drivers have attempted to write or make modifications to, see FIG. 3.

Reserved Memory Area

In one exemplary embodiment both unchangeable pages and changeable can be merged. So the driver can try to write to virtual pages that are mapped to the physical pages of the shared common set of pages. To ensure that these changes do not affect other drivers, it needs allocation of new physical pages—copies of the pages from the shared common set to which the driver is trying to write. This needs to be done very fast, but the system might not always be able to allocate a physical page. For example, in cases when the driver works at high IRQL (Interrupt ReQuest Level), this might not be possible. For that purpose in one examplary embodiment, a reserve buffer of pages with a special monitoring system, is created. The reserve buffer of pages is a set of pre-allocated physical pages. If a physical page is needed urgently (and it cannot be allocated or taken from the OS), such a page can be taken from the reserve buffer. The monitoring system ensures that the reserve buffer is never out of pages. It needs to check the number of pages in the reserve buffer, and add pages to it when necessary, instead of the ones that have been already used. The monitoring system can be, for example, a thread, which can wake up periodically.

In a partial embodiment, the initial remapping for assigning new physical addresses to virtual addresses may require free memory space analysis and produce substantial overhead. A part of non-pageable memory pool, for example, with specific absolute address may be assigned and virtually occupied. When there is a need to release virtual memory mapped to shared pages, the virtual space is remapped to specified area and then is released by system means. The same technique may be used for copy-on-write implementation. Remapping to reserved memory area is implemented and then new data is being written to specified area. Depending on frequency of unloading drivers and/or copy-on-write event, the volume or size of the protected area may be assigned. In common, the size of protected area may be 5-20% of space occupied by shared pages. The size of such a resident area may be reduced if a part of assigned area stays untouched, and increased if a lot of page fault events are generated due to lack of resources for releasing virtual pages corresponding to shared pages from protection.

The physical pages having multiple mapping are marked in the system as pages with read only access or copy on write access. These pages should be never unloaded from the memory and never be changed even if the OS attempts to make changes at kernel level as if it were using only one instance of the driver. When the virtual page should be changed, it needs to be unlinked from the physical page, and re-mapped to the copy. The fastest way to make copy is through reserving some memory in advance. The system does not always have the ability to allocate a physical page, for example, when IRQL in MICROSOFT WINDOWS are high, then a page needs to be taken from one of those that were allocated previously. When the system attempts to write data, virtual space is remapped to free pages and then a write is provided. The amount of free memory pool for further use for releasing the pages may depend on empirical statistics or may be calculated as a part of space occupied by shared pages.

In other words, all common driver pages as well as pages for releasing common pages may be stored in an allocated area of the physical memory. Subsequently, virtual addresses are mapped to these memory pages.

Unload

When a driver is unloading from the Container, and from the system, there is a need to free virtual memory space in a secure manner (but not to free common shared physical memory that shouldn't be freed). The solution to this is unmerging, i.e., (i) allocating physical memory equal to the set of identical physical pages; (ii) remapping the virtual memory pages to the allocated memory; and (iii) unloading the driver from the Container and the OS, thus freeing up the allocated memory and the memory occupied by the non-identical pages—then it is no longer commonly shared. Another solution is to mark virtual to physical as "already unloaded" analogous to discardable sections in drivers, if the OS permits such a tag. A combination of the two methods can be used.

Since virtual addresses of shared pages were remapped to different physical addresses, standard OS procedures cannot be implemented. So the virtual address is then mapped to a free or even a fake memory area and then the OS is warned that the driver may be deleted and virtual and corresponding physical memory pages are free to operate with.

So the physical memory allocated for the unchangeable shared pages stays undamaged, and mapping between the virtual addresses of unchangeable pages and the corresponding physical addresses is removed.

Since when drivers are unloading, in MICROSOFT WINDOWS, a driver unload function is first invoked, and only then the memory subsystem starts unloading the pages from the memory (and prior to this moment, it is necessary to unmerge all the previously merged pages), therefore, it is necessary to intercept into the driver unload function invocation by the driver, and start executing immediately after the function call. For example, this can involve replacing a native function of the driver (i.e., DriverUnload) to a custom function, which will be called before the function. To do this, in one of the exemplary embodiments, it is possible to insert code in to the DriverInit function that initializes the driver, and replace the appropriate value in the field of the DriverObject structure. Now, when the driver is swapped out, instead of the DriverInit DriverUnload function, the function MyNewDriverUnload will be invoked, which will first permit the native unload function to perform its operation, and then will perform unmerging of the pages.

Figure 4:
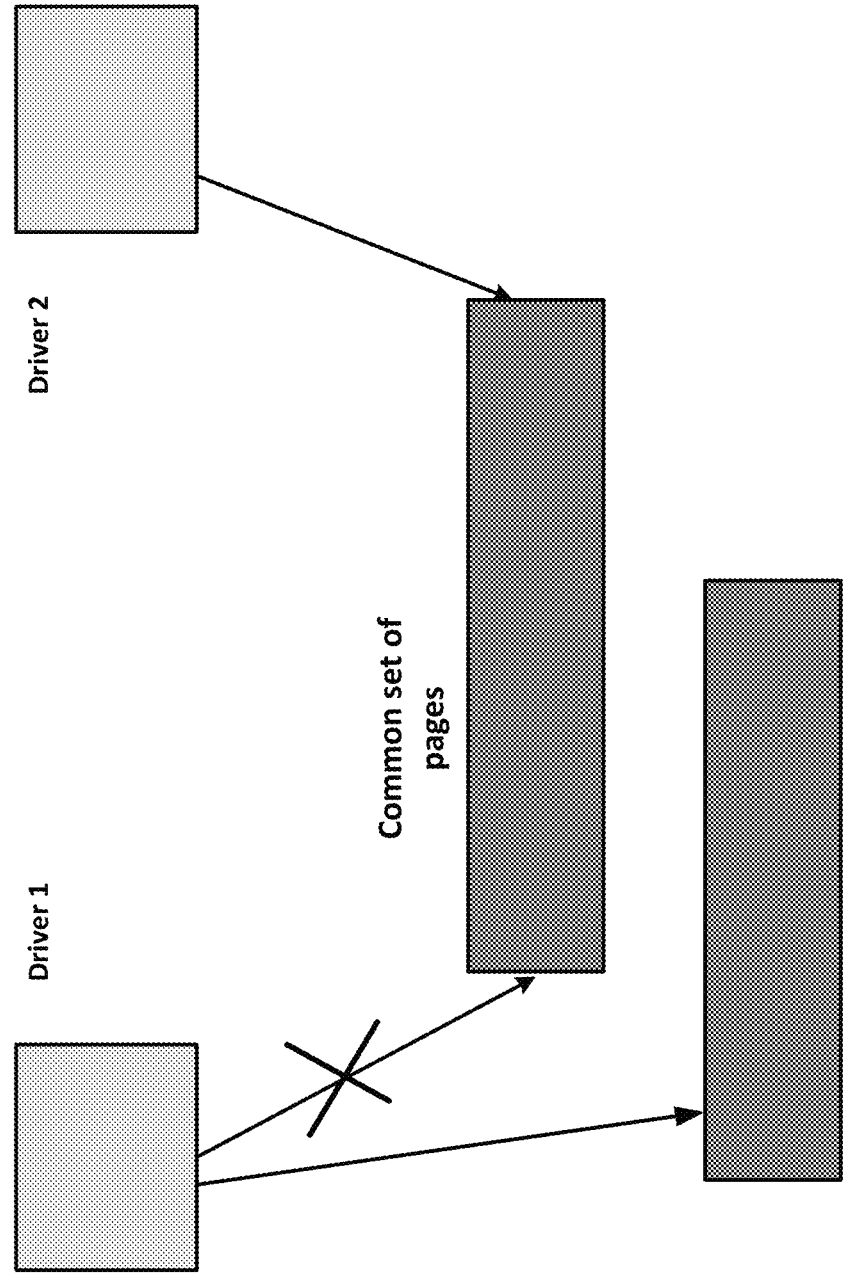
FIG. 4 illustrates unmerging of the pages of one driver.

A situation where one instance of the driver in the system needs to be unloaded is shown in FIG. 4. The pages must be unmerged during the unload. This means that after unmerging, the first driver will be no longer referring to a common set of pages, but will refer to its non-identical pages. Only after that the driver can be unloaded without crashing the system, see FIG. 4.

The unmerging of the pages refers to the process where those pages of the driver which previously referred to the pages in the common set are unmerged from the common set, and the virtual addresses no longer refer to the common ("zeroth") set physical pages. The unique pages of the driver, in other words, those pages that did not refer to the pages in the common set, are not affected. Then, the instance of the driver is unloaded using standard system mechanisms, and the operation will not affect any other loaded instances of the driver.

To correctly unload the driver, this is still insufficient, since the virtual addresses of the common pages of this driver do not refer to anything correctly. It is possible to allocate new pages to the driver, specifically for the unload process. However, this can lead to high loads on the memory subsystem, and, possibly to a shortage of pages, particularly during a mass offloading of the drivers, for example, when the system is being shut down.

Because of that, the standard approach is not used, rather, the approach is used analogous to the Discardable sections of the drivers. The pages (i.e., the virtual addresses of the pages of the driver, which previously refers to the physical addresses from the common set, are marked as "already unloaded", and after this, the driver can be properly unloaded using the mechanisms of the operating system itself.

Figure 12:
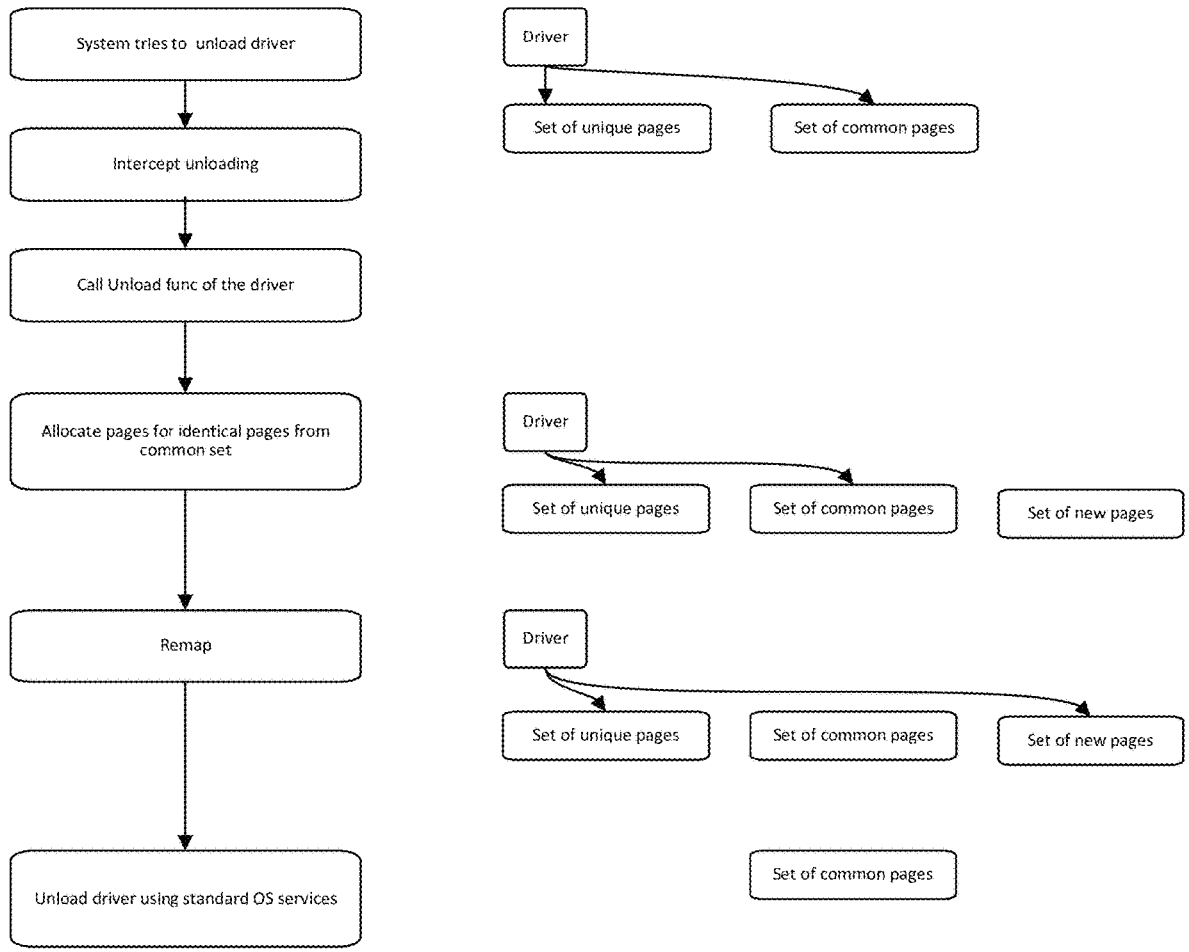
FIG. 12 illustrates a flowchart for a method for unloading the driver.

FIG. 12 illustrates a flowchart for a method for sharing driver pages in accordance with one exemplary embodiment. In step 1201, the system tries to unload a driver. In step 1202, the system's attempt is intercepted, and in step 1203 the driver native procedure of unloading is called—the driver unload function. During all this time, the driver works with its own unique pages and with pages from the shared set, as can be seen from the right side of the figure. Then, in step 1204, a set of new pages is allocated. Its size must be equal to the number of the pages that this driver has in the shared common set of pages. In step 1205, the virtual addresses of the driver, which previously referred to pages from the shared set, are remapped, and start referring to the newly allocated pages. This is shown in the right half of the figure. In step 1206, the driver can be unloaded using standard OS mechanisms. During this step, the system, will also free all the pages of the physical memory that are occupied by the driver, both unique ones and newly allocated ones. As can be seen from the right half of the figure, the shared set of pages remains in the system, and other copies of the driver can continue working with it. It should be noted that the steps "intercept unloading" and "call unload function of the driver", noted above, can be switched places, depending on the implementation. Also, the step "call unload function of the driver" can be part of the step "unload driver using standard OS services", in order to do this, for correct execution of this function, after the remapping, it is also necessary to copy the data that was on the pages from common set to the newly allocated ones.

Figure 13:
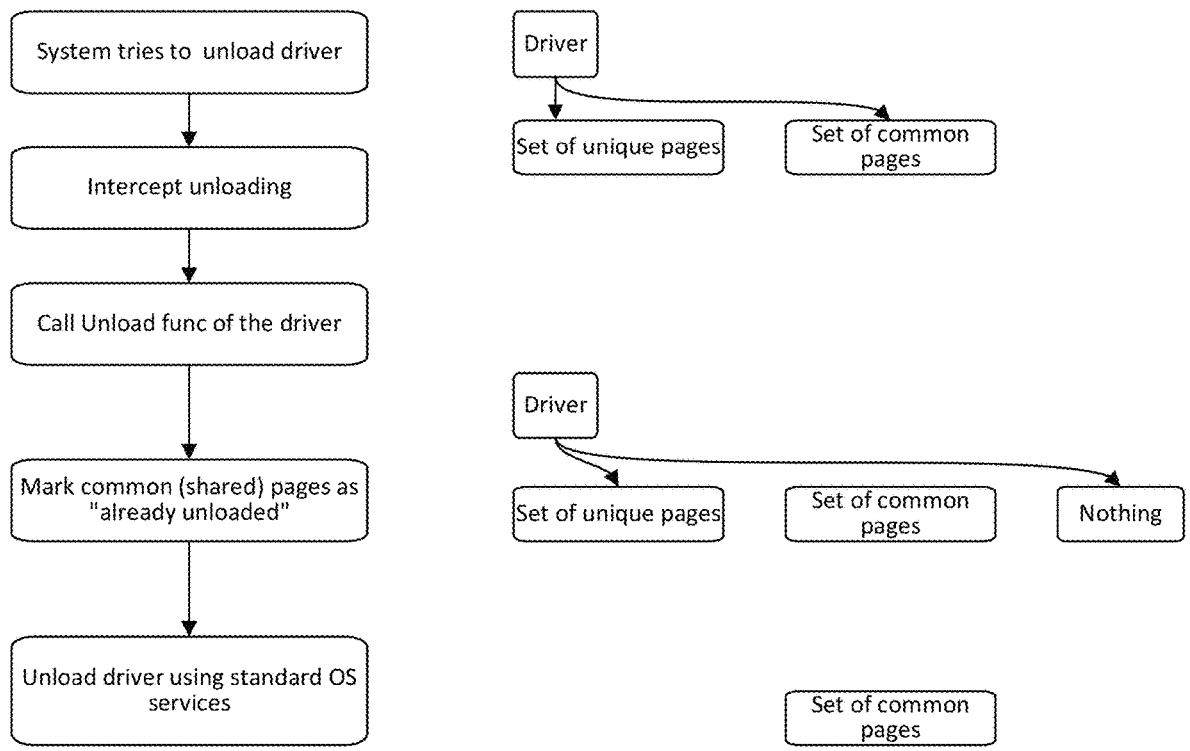
FIG. 13 illustrates a flowchart for a method for unloading the driver, in accordance to another exemplary embodiment.

FIG. 13 illustrates a flowchart for a method for sharing driver pages in accordance to another exemplary embodiment. (For example, it can be used in the WINDOWS operating system). When the system attempts to unload the driver, in step 1301, this attempt is intercepted (step 1302), and a driver unload function is invoked (step 1303). On the right half of the figure, it is shown that the driver continues to work with its own unique pages and with the pages from the common set. Prior to this moment, the system functions analogously to that shown in FIG. 12. In step 1304, the link between the virtual addresses of the identical/shared virtual pages of the driver and the physical pages from the shared set, to which they referred, is broken. Virtual pages are now marked as "already unloaded", analogous to the discardable sections in the drivers, and no longer refer to the physical memory. In step 1305, the driver can be unloaded using standard OS mechanisms, but now only unique pages are freed. Again, as shown in the right half of the figure, the shared set of pages remains in the system, and other instances of the driver can continue to work with it. It should also be noted that the intercept steps and the call unload function of the driver step can be switch places, depending on the implementation.

Once all the instances of the drivers have been unloaded or removed, the zeroth set of pages needs to also be removed from the memory. When the our system is unloading, it needs to first wait until all the working instances of the driver being deduplicated finish their operation, because otherwise, due to the specifics of how the moment of unloading is tracked, they might not be able to be unloaded without it.

Implementation

The proposed method is particularly applicable to Container virtualization for MICROSOFT WINDOWS. However, the approach is applicable not only to driver deduplication, but more generally to application deduplication, where multiple Containers load instances of the same application (for example, Apache server). Since Containers and real execution environments can have several copies of the driver for one system, the exemplary embodiment can be applied not only to the Containers and other virtual technologies, but to any systems using several drivers with common pages. Note that the approach described herein may be referred to as inline deduplication (since identity of the driver pages is determined early in the process of loading a driver into the memory, rather than deferred deduplication, which is a more common deduplication approach). It is worth mentioning that in the method described herein, drivers are installed and working in the system without any changes to their code, and each Container acts as if it has its own copy of the driver. Another approach to loading drivers into Containers is sometimes called "enlightment". In it, driver code is changed so that the driver could work with multiple Containers.

In the case of a Copy-On-Write for Container virtualization for MICROSOFT WINDOWS, it is possible to merge such pages (of drivers, and other components), as long as such pages are identical, and the Container writes to these pages apparently rarely.

Additionally, this approach can optimize memory usage for virtual machines running under MICROSOFT WINDOWS. For example, frequently such virtual machines are running the same guest operating system (in other words, in this example, MICROSOFT WINDOWS as the guest operating system), and it is therefore possible to optimize memory distribution between the virtual machines, tracking the loading and unloading of the drivers in the virtual machine, while other work is performed on the host side. Thus, where before it was necessary to analyze the memory in order to identify pages that are identical, it is now possible to receive some of this information from the operating system itself.

User machines can also take advantage of the technology described herein, for example, with regard to drivers and multiple instances of the same driver, also, for virtual pages with user data which is suspected of being identical, particularly when it is known that writes to these virtual pages occur fairly rarely.

The main advantage of the exemplary embodiment is that the system allocates and merges driver pages at driver loading—not at installation.

As a further embodiment, a driver can be only a Container driver, but not part of the host OS, and, therefore, the "zeroth" copy of the driver "lives" in one of the Containers, and not in the host OS.

Figure 14:
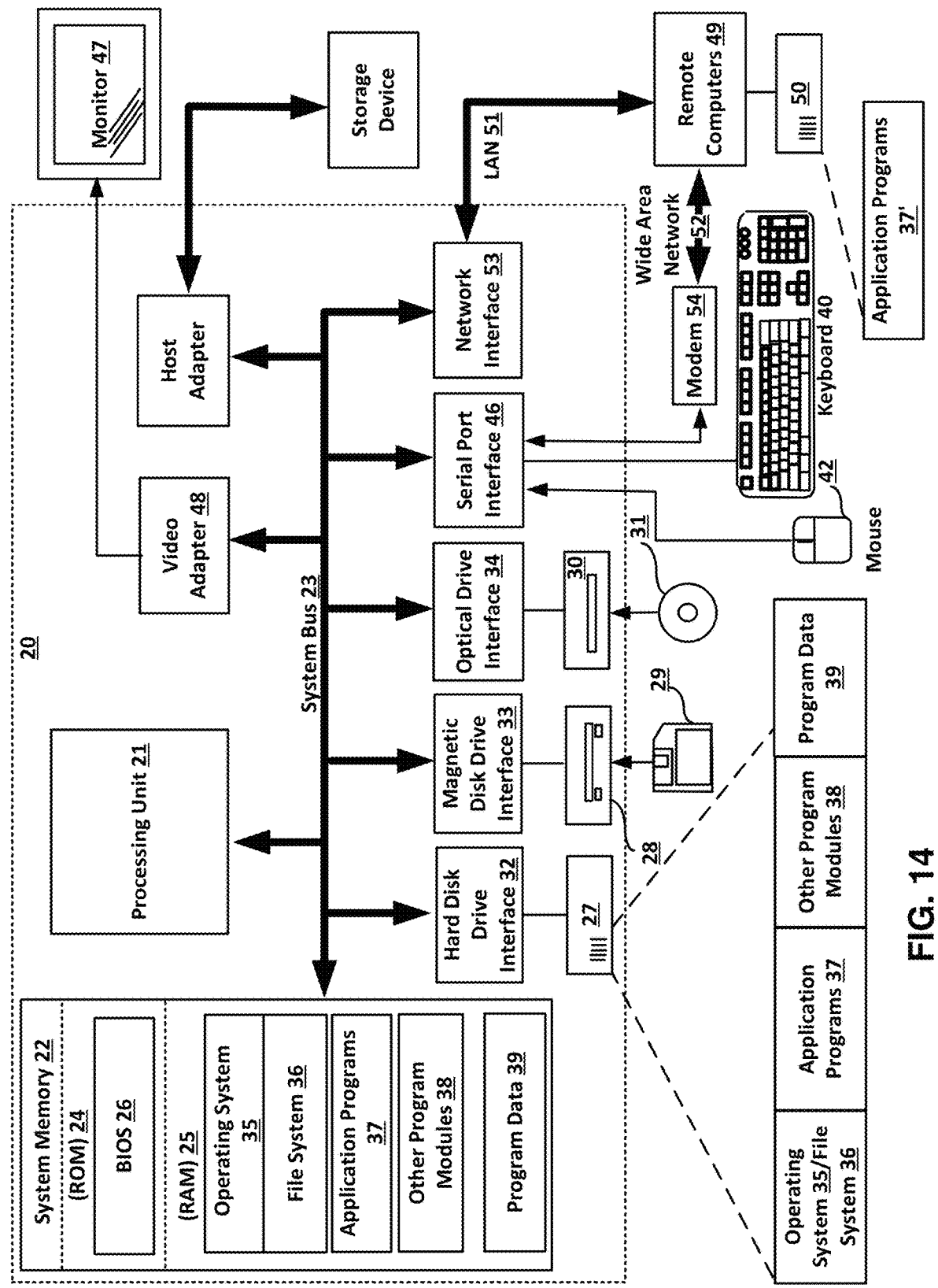
FIG. 14 illustrates a computer system or a server, which can be used in the exemplary embodiment.

With reference to FIG. 14, an exemplary system for implementing the invention includes a general purpose computing device in the form of a host computer or a server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 20, such as during start-up, is stored in ROM 24.

The computer 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Microsoft Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and it typically includes some or all of the elements described above relative to the personal computer 20, although here only a memory storage device 50 is illustrated. The logical connections include a local area network (LAN) 51 and a wide area network (WAN) 52. Such networking environments are common in offices, enterprise-wide computer networks, Intranets and the Internet.

In a LAN environment, the personal computer 20 is connected to the local network 51 through a network interface or adapter 53. When used in a WAN networking environment, the personal computer 20 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the personal computer 20, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A computer-implemented method for sharing driver pages among Containers, the method comprising:
   on a computer system having a processor, a single operating system (OS) and a first instance of a system driver installed and performing system services, instantiating a plurality of Containers that virtualize the OS,
   wherein the first instance of the system driver is loaded from an image into a plurality of pages, and
   instantiating a second instance of the system driver upon a request from one of the Containers for system services by:
   (a) allocating virtual memory pages for the second instance and loading, from the image, the second instance into a physical memory;
   (b) acquiring virtual addresses of identical pages of the first instance compared to the second instance;
   (c) mapping the virtual addresses of the identical pages of the second instance to physical pages to which virtual addresses of the corresponding pages of the first instance are mapped, and protecting the physical pages from modification;
   (d) releasing the physical memory occupied by the identical physical pages of the second instance; and
   (e) starting the second instance.

2. The method of claim 1, wherein, in step (c), virtual addresses of non-identical pages of the second instance remain mapped to the physical pages of the second instance.

3. The method of claim 1, wherein, in step (b), the second instance is associated with the first instance.

4. The method of claim 1, further comprising performing steps (a)-(e) for a subsequent driver and another Container.

5. The method of claim 1, wherein the first instance is installed and started in the one of the Containers upon a request from a user.

6. The method of claim 1, wherein the identical pages of the first instance are write-protected and identical pages of the second instance are mapped to the corresponding physical pages of the first instance.

7. The method of claim 1, further comprising:
   when the first instance is loading, creating a set of physical pages that do not belong to any of the drivers, wherein;
   (i) the identical pages of the first instance are remapped to the physical pages of the set of physical pages;
   (ii) the physical memory occupied by the identical physical pages of the first instance is released; and
   when the second instance is loading:
   (iii) the identical pages of the second instance are mapped to the physical pages of the set of physical pages;
   (iv) the physical memory occupied by the identical physical pages of the second instance is released.

8. The method of claim 1, wherein when the second instance is loading, identical pages of the second instance are directly mapped to the physical pages, to which virtual addresses of the corresponding identical pages of the first instance are mapped and no physical memory is allocated for the identical pages of the second instance.

9. The method of claim 8, further comprising intercepting driver loading and unloading to perform a cleanup of the mapped pages and allocating a random accessed memory for any private and the identical physical pages by a memory manager.

10. The method of claim 1, further comprising creating a driver database with Container-specific settings including driver name, registry parameters and file parameters.

11. The method of claim 1, wherein a match of the first instance and the second instance is checked by comparing pages of the second instance to pages of the first instance.

12. The method of claim 1, wherein a match of the first instance and the second instance is checked using information about any of name, version, and driver checksum.

13. The method of claim 1, further comprising enumerating the second instance prior to loading it into the Container by assigning a unique number to the second instance.

14. The method of claim 13, further comprising changing names of any instances of the system driver so that each Container has a driver with a unique name.

15. The method of claim 14, wherein on attempt to modify any shared page by any instance of the system driver:
   a new physical page is allocated;
   contents of a corresponding shared page are copied to a newly allocated physical page; and
   a virtual address of the driver page is remapped to the newly allocated physical page.

16. The method of claim 1, further comprising:
   (i) generating a reserve buffer which is a set of pre-allocated pages used for unmerging driver pages if a host OS does not provide pages; and
   (ii) ensuring that the buffer is never out of pages.

17. The method of claim 1, wherein the identical pages are locked in the memory and are not swappable to a disk.

18. The method of claim 1, wherein the non-identical pages are locked in the memory and are not swappable to a disk.

19. The method of claim 1, wherein when a driver is unloaded, only non-identical pages are released.

20. The method of claim 19, wherein stopping the system driver being unloaded includes:
   (a) allocating physical memory equal to the set of identical physical pages;
   (b) remapping the virtual memory pages to the newly allocated memory;
   (c) unloading the driver from the one of the Containers and the OS;
   (d) freeing up the allocated memory and the memory occupied by the non-identical pages.

21. The method of claim 20, wherein virtual addresses of the identical pages of the driver are marked as already unloaded.

22. The method of claim 20, wherein, when a last instance of the system driver is unloaded from system, all allocated memory is released.

23. A system for sharing driver pages among Containers, the system comprising:
   on a computer system having a processor, a single operating system (OS) and a first instance of a system driver installed and performing system services;
   a plurality of Containers that virtualize the OS,
   wherein the first instance of the system driver is loaded from an image into a plurality of pages, and
   a second instance of the system driver instantiated upon a request from one of the Containers for system services by:
   (a) allocating virtual memory pages for the second instance and loading, from the image, the second instance into a physical memory;
   (b) acquiring virtual addresses of identical pages of the first instance compared to the second instance;

(c) mapping the virtual addresses of the identical pages of the second instance to physical pages to which virtual addresses of the corresponding pages of the first instance are mapped, and protecting the physical pages from modification; and
(d) releasing the physical memory occupied by the identical physical pages of the second instance.

* * * * *